United States Patent [19]

Deuss et al.

[11] Patent Number: 5,153,372
[45] Date of Patent: Oct. 6, 1992

[54] DEVICE FOR THE DETECTION OF OBJECTS AND THE FIRING OF HORIZONTAL MINES

[75] Inventors: Matthias Deuss, Neuss; Helmut Pfaff, Düsseldorf, both of Fed. Rep. of Germany

[73] Assignee: SenSys AG, Kaiserstuhl, Switzerland

[21] Appl. No.: 569,859

[22] Filed: Aug. 20, 1990

[30] Foreign Application Priority Data

Aug. 22, 1989 [DE] Fed. Rep. of Germany ....... 3927662

[51] Int. Cl.⁵ ................ F42C 13/02; F42C 13/06
[52] U.S. Cl. .................... 102/427; 102/211
[58] Field of Search .......... 102/211, 213, 401, 404, 102/405, 427

[56] References Cited

U.S. PATENT DOCUMENTS

| 3,509,791 | 5/1970 | Pechamat et al. | 102/427 |
| 4,712,479 | 12/1987 | Babel | 102/427 |

FOREIGN PATENT DOCUMENTS

| 3705081 | 9/1988 | Fed. Rep. of Germany | 102/427 |
| 2541444 | 8/1984 | France | 102/427 |
| 2185556 | 7/1987 | United Kingdom | 102/427 |

Primary Examiner—Harold J. Tudor
Attorney, Agent, or Firm—Marmorek, Guttman & Rubenstein

[57] ABSTRACT

A device for detecting an object such as a tank in a target area and for causing a horizontal mine to be fired at the object, comprises first and second microphones which detect noise, including noise from a tank, in the target area, in infrared sensor having a directional characteristic which is narrow with respect to the target area and which extends towards the center of the target area to define a target window, and an electronic evaluation unit. The electronic evaluation unit receives acoustic signals from the microphones and calculates a correlation function from the acoustic signal. If a property derived from the calculated correlation function, for example, the correlation or the correlation gradient, exceeds a predetermined threshold, the firing mechanism of the horizontal mine is enabled. If the infrared sensor also detects the presence of an object within its target window, the electronic evaluation unit will cause the horizontal mine to be fired.

7 Claims, 11 Drawing Sheets

DEVICE FOR THE DETECTION OF OBJECTS AND THE FIRING OF HORIZONTAL MINES

BACKGROUND OF THE INVENTION

The invention is directed to a device for the detection of objects and the firing of horizontal mines. The device is especially useful for defense against tanks which enter a target area.

Up to now, in addition to artillery weapons and similar weapon systems, antitank mines have been used for fighting against tanks. Antitank mines have the characteristic of being effective over a long period of time without any personal effort. They have been used to protect limited areas against the attack of tanks or to block off areas from tanks. However, it is a disadvantage that these antitank mines have to be installed in a widespread manner with regard to width and depth in order to offer effective protection.

The use of so-called "horizontal mines" is desirable in order to avoid such area-covering measures in fighting against tanks. They have the advantage of effectively covering a target area depth of up to 100 m. By the term "horizontal mines" is meant missiles which are fired from launchers fixedly installed in the combat field if a tank which is to be attacked comes into the target area along the missile's line of fire. The line of fire is a fixed parameter of the installed launcher. The inventive device for the detection of objects and the firing of horizontal mines is normally integrated into such a launcher.

The invention is based on the problem to provide a device which causes a horizontal mine to be fired at exactly the moment in which a tank comes into the line of fire.

SUMMARY OF THE INVENTION

The inventive device which solves this problem comprises two microphones which are sensitive to tank noise, an infrared sensor having a directional characteristic along the line of fire of the horizontal mine, and an electronic evaluation means. The microphones are directed to the target area in the center of which the directional beam of the infrared sensor, which is narrow relative to the width of the target area, extends. The electronic evaluation means calculates the correlation function of the acoustic signals received by the two microphones. If the correlation between the acoustic signals is within a well-defined range which exceeds a predetermined threshold, and/or if the correlation gradient exceeds a predetermined threshold, the firing mechanism of the mine is enabled. This is referred to herein as "acoustical release." If the infrared sensor also detects the presence of an object within its directional characteristic, the horizontal mine is fired.

The term "directional characteristic or directional club" used herein refers to the relatively narrow reception characteristic of an infrared sensor. The term "correlation" refers to the presence of any relationship between two or more stochastic variables and its mathematical representation. The mathematical representation of the relationship is the correlation function. The correlation function is an essential element of modern communications theory (see, Jaglom, "Einführung in die Theorie stationärer Zufallssfunktionen", Berlin 1959). In the present case the stochastic variables are the sound signals which are received by the two microphones.

For clarification of the invention, the following mathematical principles are presented:

The correlation function $K_{12}(\tau)$ of two signals $S_1, S_2$ can be shown generally in the following manner:

$$K_{12(\tau)} = \lim_{T \to \infty} \frac{1}{2T} \int_{-T}^{T} S_{1(t)} \cdot S_{2(t+\tau)} \, dt \quad (1)$$

wherein $\tau$ is the time delay between the two signals, and T is the integration time.

For discrete time sequences $S_1(k)$, $S_2(k)$ the correlation function can be shown as:

$$K_{12(k\tau)} = \frac{1}{N} \sum_{k=0}^{N-1} S_{1(k)} \cdot S_{2(k+k\tau)} \quad (2)$$

Instead of the above-cited correlation function (2), a correlation coefficient can be calculated in the present case as follows:

$$p = \frac{\sum_{k=0}^{N-1} S_{1(k)} S_{2(k-k\tau)}}{\sqrt{\sum_{k=0}^{N-1} S_{1(k)}^2 \sum_{k=0}^{N-1} S_{2(k)}^2}}$$

with $-1 \leq p \leq 1$.

The value of the correlation coefficient p is independent of the amplitude of the signals $S_1$ and $S_2$.

According to the invention, there are several possibilities for the design of the microphones. Microphones can be used which have no significant directional characteristic. The essential portions of the spectrum of the processed sound signals are in the range of about 70-200 Hz, and generally an acoustic directional effect is not possible with such relatively low frequencies. Of course, a very rough directional characteristic is provided by the longitudinal axis of the microphone.

Preferably, the microphones are directed to the target area with their axes parallel to one another, and the directional club of the infrared sensor extends in parallel to the axes of the microphones.

More particularly, the microphones are located in a horizontal plane adjacent to the horizontal mine, and the infrared sensor is located above the mine between the microphones. The spacing of the microphones from one another is preferably about 0.5 m.

According to a further embodiment of the invention, the microphones are designed as directional microphones with directional characteristics defining a target area, and a rectangular target window is defined within the target area. Such directional microphones have symmetrical conically spreading directional characteristics as their reception characteristics which is customary for directional microphones.

With regard to operation of the invention it is desirable that after installation and activation of the horizontal mine, in a first operational phase, only one of the microphones and a portion of the electronic evaluation means is switched on until a sound signal typical for tanks has been detected. When this occurs, the switched-on portion of the electronic evaluation means switches on the second microphone and the remaining portion of the electronic evaluation means for a second operational phase. The electronic evaluation means will also switch on the infrared sensor for a third operational phase if the predetermined correlation threshold or the predetermined correlation gradient is exceeded. By this manner of operation, considerable energy is saved since only one portion of the device is permanently in operation. If the infrared sensor detects a target, the mine is fired.

BRIEF DESCRIPTION OF THE DRAWINGS

The invention is described below in detail by reference to the drawings, wherein.

DETAILED DESCRIPTION OF THE INVENTION Detailed

The device shown in the Figures comprises two parallel microphones (M1, M2) which are laterally fastened to the body 1 of the mine and are adjusted to receive sound signals from the direction of a target area, and an infrared sensor S mounted above the body 1 of the mine having an optical axis which is also adjusted in the direction of the target area.

Figure 1:
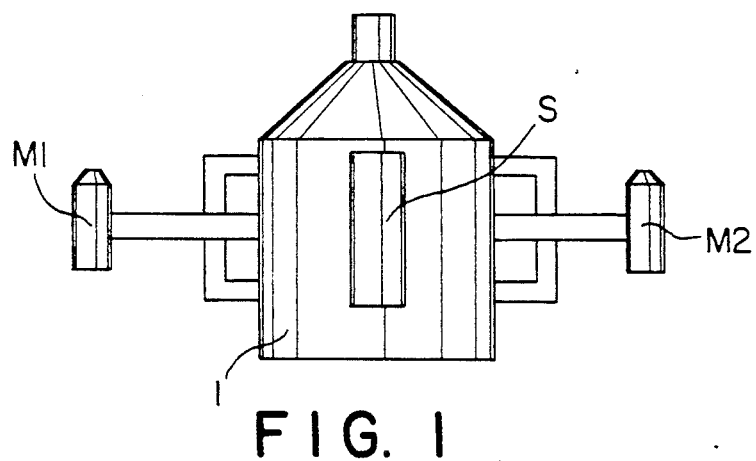
FIG. 1 shows schematically a horizontal mine with the inventive device.
Figure 2:
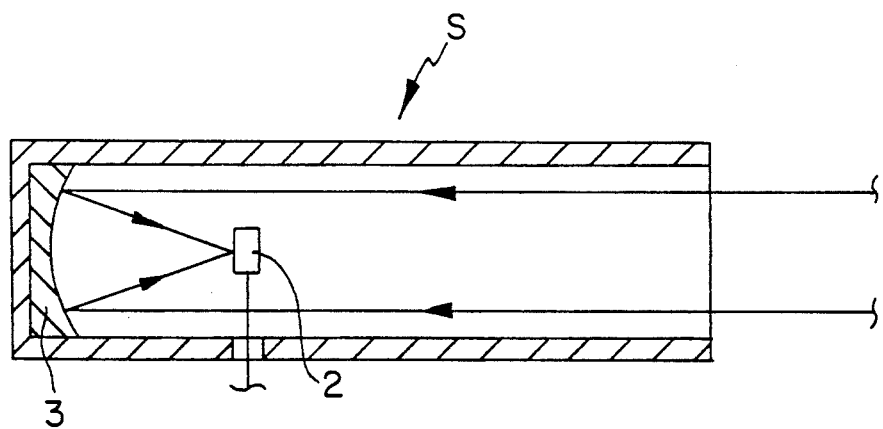
FIG. 2 shows the beam path of the infrared sensor of the device according to FIG. 1.

The infrared sensor S comprises substantially a pyroelectric infrared detector 2 which is located at the focal point of a spherical hollow mirror 3. FIG. 2 shows schematically the beam path in the sensor S. The mirror 3 concentrates the heat radiation coming from the direction of the target onto the effective area of the detector 2. In this way, the radiation capacity received by the detector 2 is enhanced by about a factor at 2000 relative to a system not having any mirror. The cone optically registered by the sensor S has, for instance, a vertex angle of 2/100 of a degree. The "field of view" of the sensor S is a cone having a radius of about 0.5 m at a distance of 50 m from sensor S.

The acoustic and the optical signals are processed in parallel by the electronic evaluation means. The functional sequence of the system, from the detection of the object up to the firing, can be separated into three phases:

Phase 1: In this "stand-by phase," only one microphone and a portion of the electronics are in operation. If this microphone detects non-transient noise which can be associated with a typical frequency range for vehicles, the mine is "awakened".

Phase 2: In this phase, both microphones and the complete electronics are in operation. The microphones receive acoustic signals from an approximating target object. The signals are digitized and fed to a computer for processing which carries out a correlation analysis with the signal values. This means that the signals received by the microphones M1 and M2, separated by a propagation time difference, are used to calculate a correlation function and from this the "mean" correlation of the signals is determined. The value of the correlation function is independent of the propagation time difference of the two signals and thus of the lateral spacing of the target object from the line of fire. The correlation function reaches a maximum when the detected noise source is on the line of fire, i.e., when the propagation time difference becomes zero. When the correlation function exceeds a defined threshold, i.e., the target object is immediately before the line of fire, the system is transferred to phase 3 wherein the infrared sensor is activated.

Phase 3: In this phase, the firing of the mine is "acoustically" released, i.e., the firing mechanism has been enabled due to the acoustic signals from the two microphones. If the target object moves into the line of fire, it is optically detected by the infrared sensor, and the shot is fired.

Figure 3:
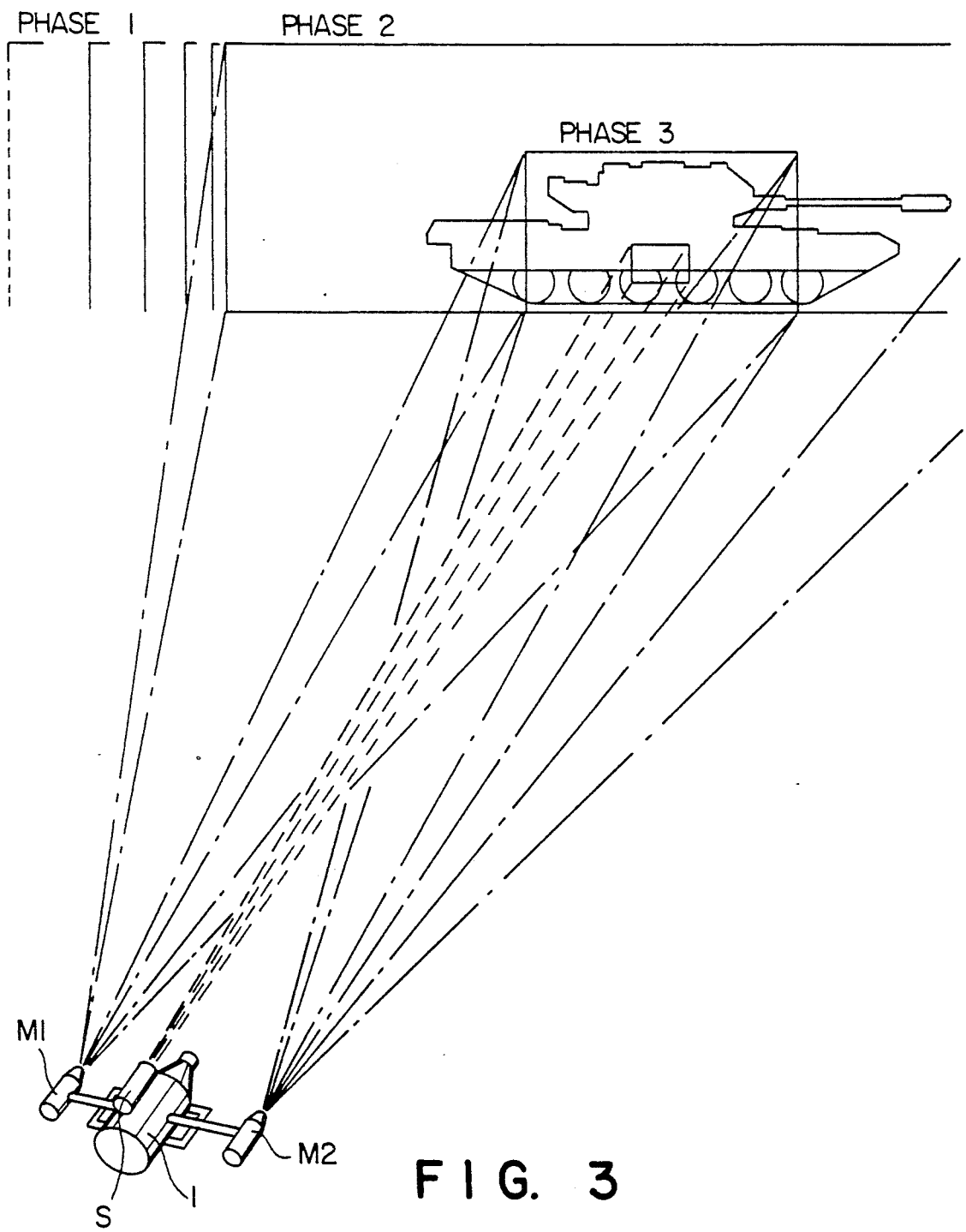
FIG. 3 shows a horizontal mine with the inventive device in operation.
Figure 4:
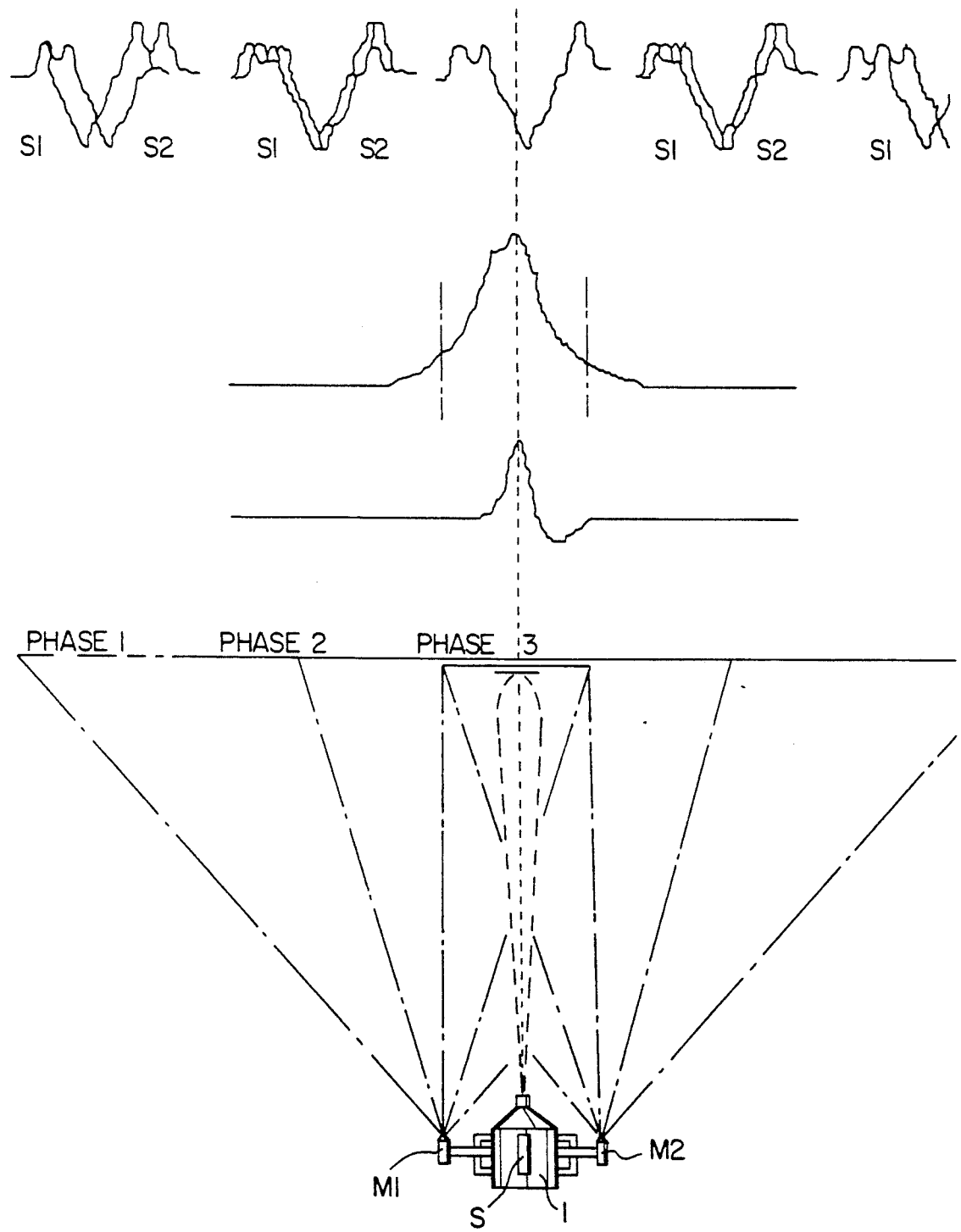
FIG. 4 shows a simplified representation of a horizontal mine in operation with graphical representations of the sound signals, the correlation function, and the signal from the infrared sensor.

FIGS. 3 and 4 show the decision sequence in a different manner. The combining of acoustic and optical activation criteria has the following advantages: the high sensitivity and the narrow directional club (characteristic) of the infrared sensor have the advantage of a high aiming exactness even at large distances in contrast to a pure acoustic solution. The simultaneous incorporation of an acoustic activation criterion offers safety with respect to false releases by the infrared sensor since it enables a differentiation of different infrared radiating objects.

Figure 5:
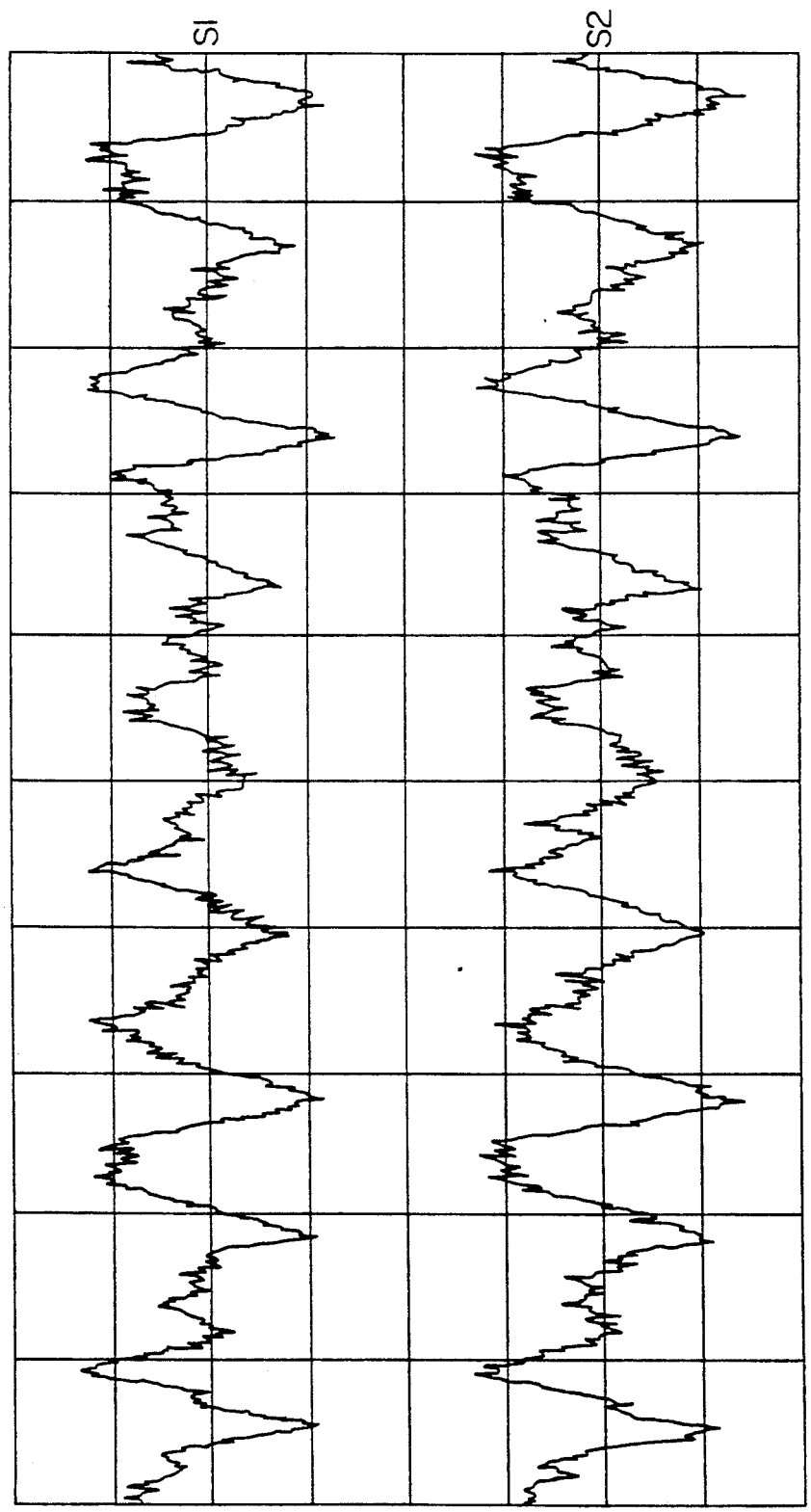
FIG. 5 shows the sound signals which have been received by both microphones in a special operative condition, i.e., in a correlation range above a predetermined threshold.

The other drawings show examples of real acoustic signals or infrared signals, and three correlation functions which have been calculated from the signals of the passing tanks. FIG. 5 shows the signals S1, S2 of an M60 tank as it passes the line of fire. The distance between the tank and the microphones was 30 m while the velocity of the tank was 20 km/h. The measurement was carried out under very favorable conditions, i.e., without any substantial disturbing noise. Accordingly, both signals show a high degree of consistency.

Figure 6:
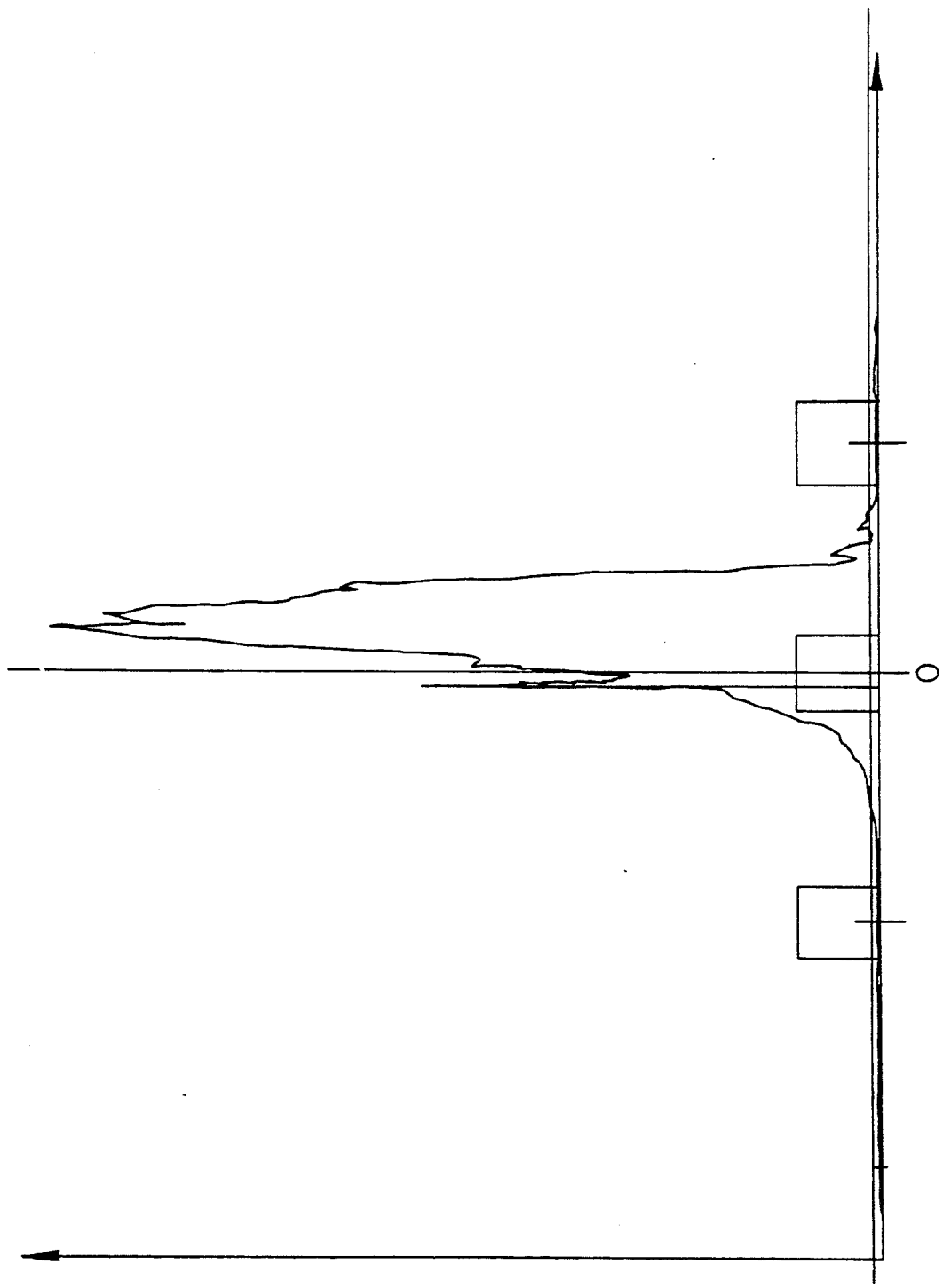
FIG. 6 shows the correlation function of the sound signals in FIG. 5.

FIG. 6 shows the correlation function calculated using the signals $S_1$, $S_2$ from FIG. 5 of the passing tank, shown as a function of the lateral distance from the line of fire. The rectangular markings show the positions of the tank at a distance of 25 m to the right and to the left of the line of fire. The central rectangular marking is a target window within which the tank is in the target area. The maximum of the correlation function occurs about 3 m behind the zero passage of the tank (relative to the center of the tank), i.e., at the position of the back of the tank. The reason for this is that the main noise source (exhaust slots) is located on the backside of the M60 tank. This shows the problems with respect to pure acoustic targeting. The targeting depends on the location of the noise source on the target object. Activation at the maximum of the correlation function would not be possible. However, the rising edge of the correlation function can be used for "acoustic" enabling of firing, i.e., for the initialization of phase 3. In FIG. 6, the start of phase 3 is indicated by a vertical line about 1 m from the zero passage of the center of the tank. The decision for the initialization of phase 3 is carried out by the computer during calculation of the correlation function.

Figure 7:
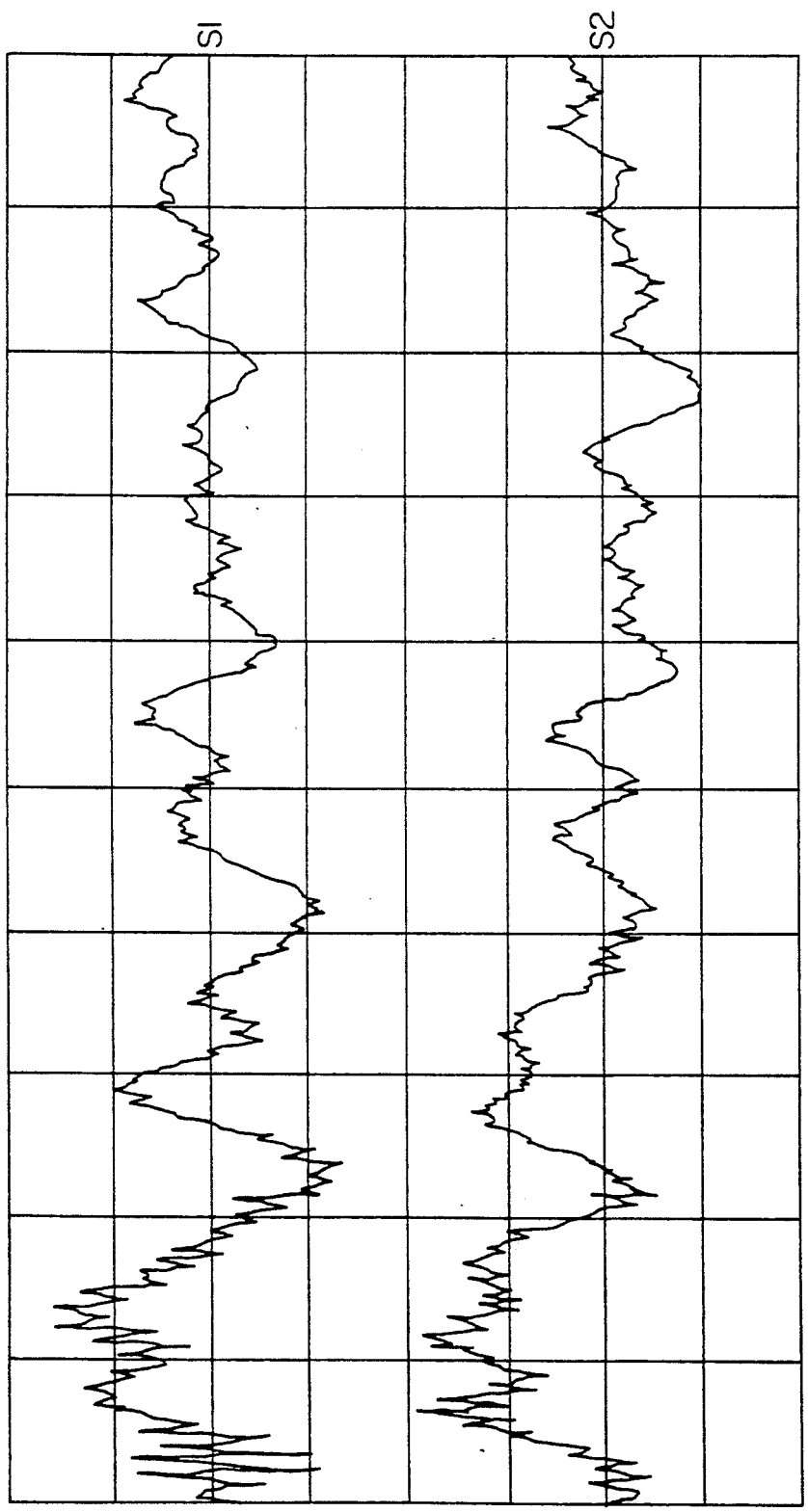
FIGS. 7 and 9 show sound signals corresponding to FIG. 5 which have been received by both microphones in another operative condition.
Figure 8:
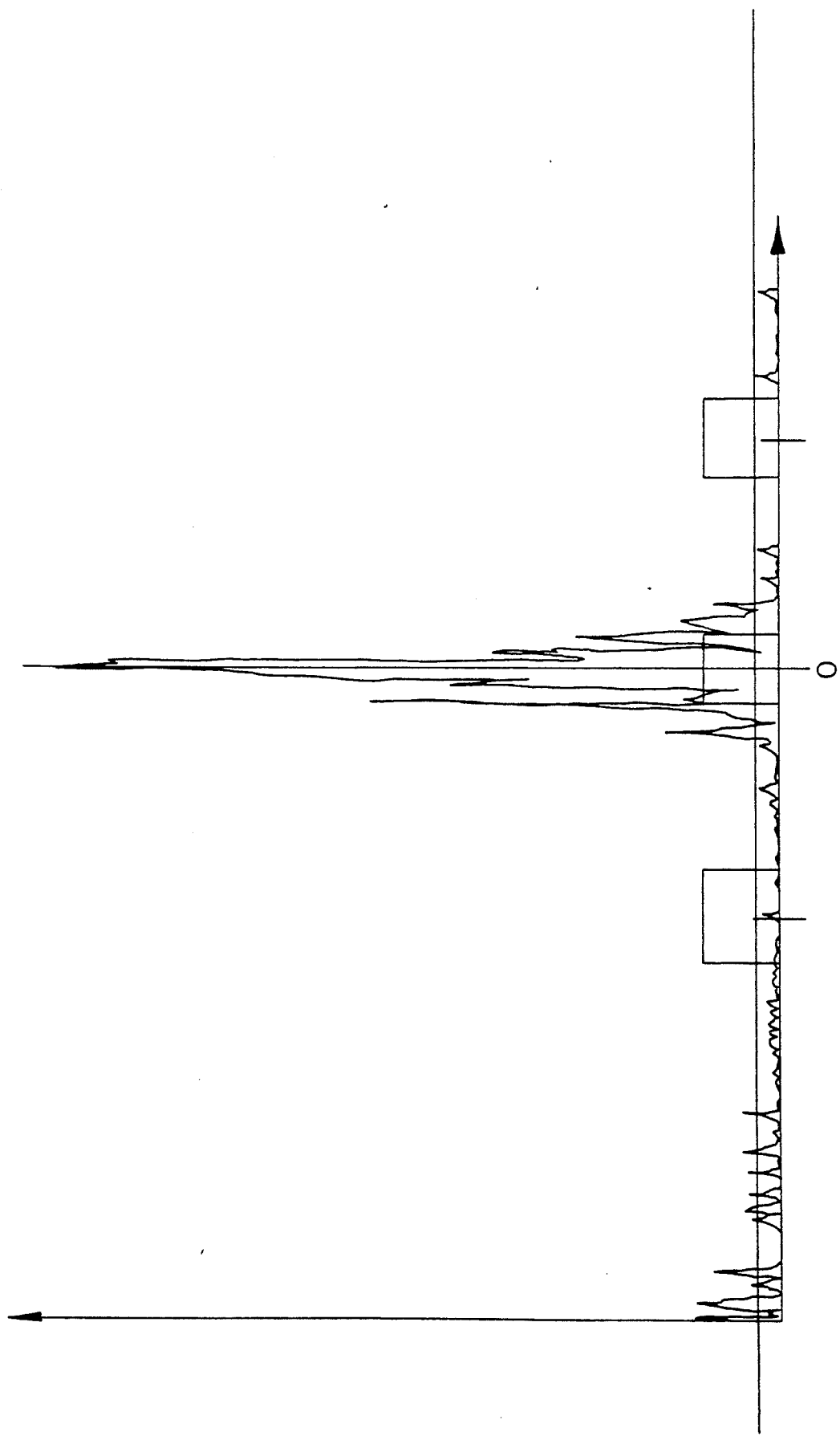
FIGS. 8 and 10 show the correlation functions for the sound signals of FIGS. 7 and 9 respectively.

FIGS. 7 and 8 show the corresponding diagrams for an infantry tank. When considering these results, two points are of importance: the signals are disturbed by wind noise and they do not show the good consistency of the signals from the M60 tank shown in FIG. 5. Nevertheless, the corresponding correlation function in FIG. 8 shows an unambiguous maximum when the tank passes the line of fire. In this figure, outside of the main maximum, smaller secondary maxima exist which have been generated by wind disturbances. The computer decision for the initialization of phase 3 is here about 3 m prior to the passing of the center of the tank through the line of fire.

Figure 9:
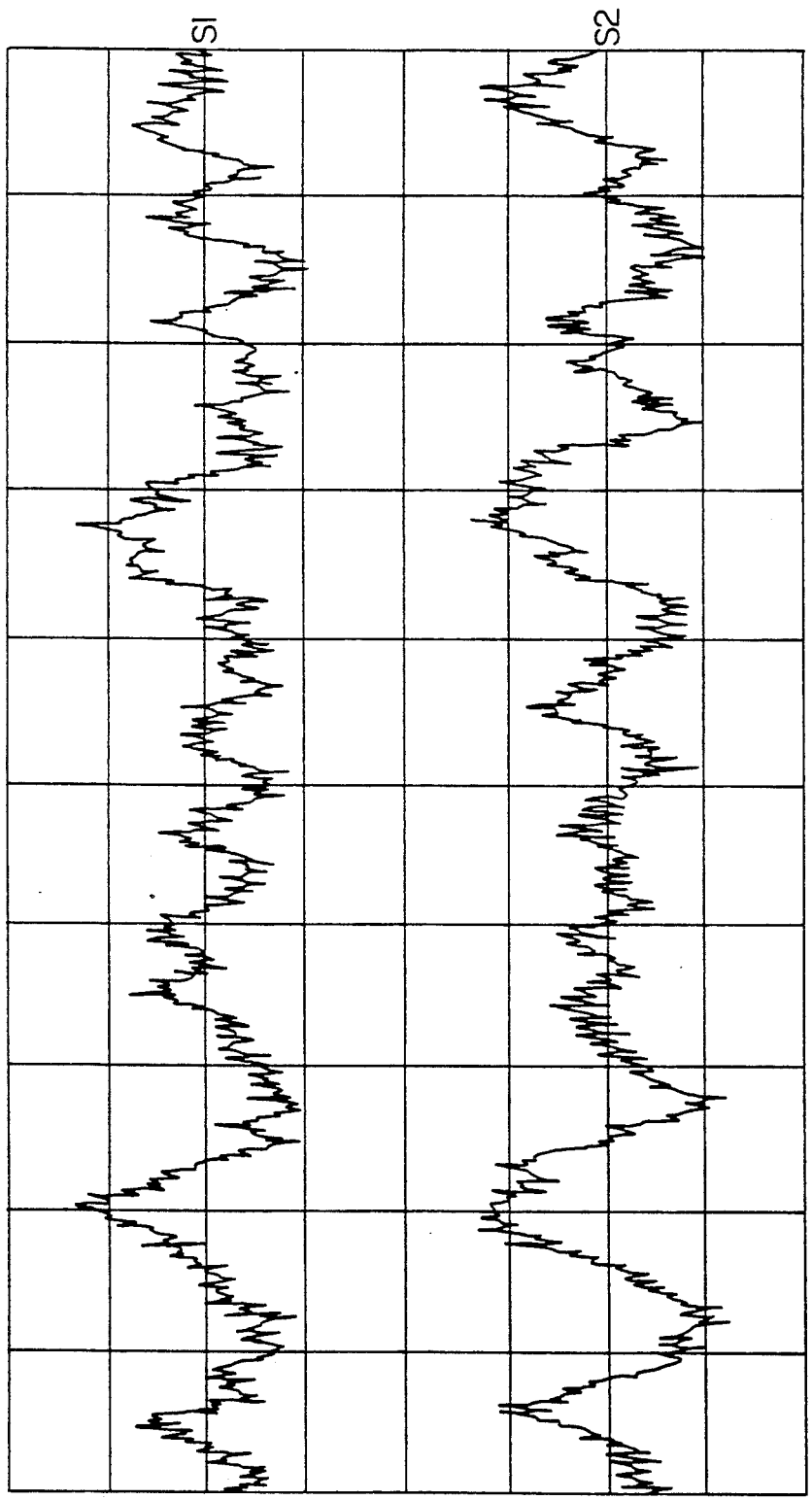
Figure 10:
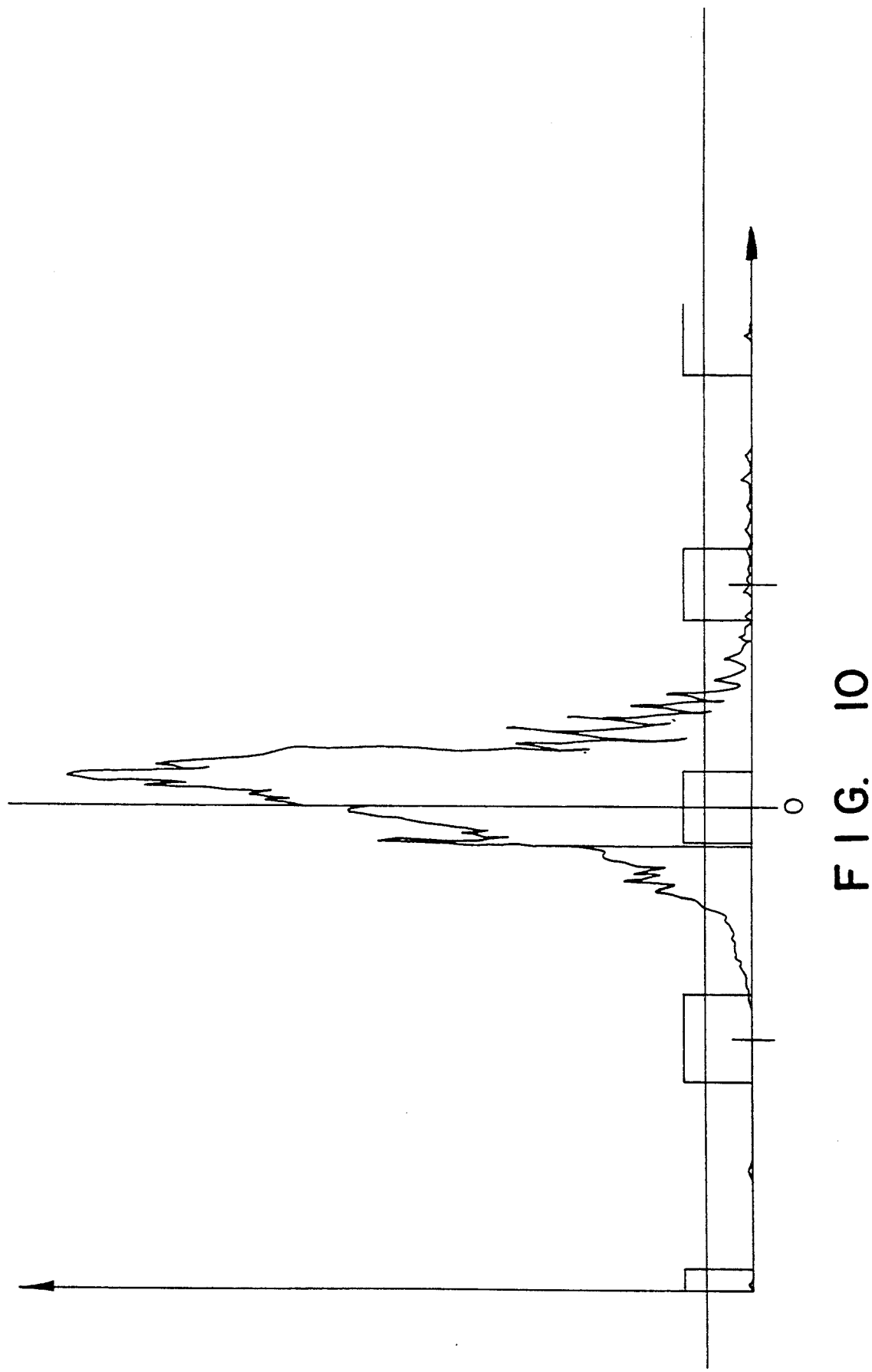

FIGS. 9 and 10 show the sound signals received from the two microphones (M1 and M2), and the correlation function for two tanks (an M60 tank and a Kürassier tank) driving one behind the other and separated by a distance of 25 m. Compared to FIG. 5, the correlation function of FIG. 10 shows stronger disturbances caused by the superposition of the signals from the two tanks. FIG. 10 shows that phase 3 is initialized immediately before the target window 3.

Figure 11:
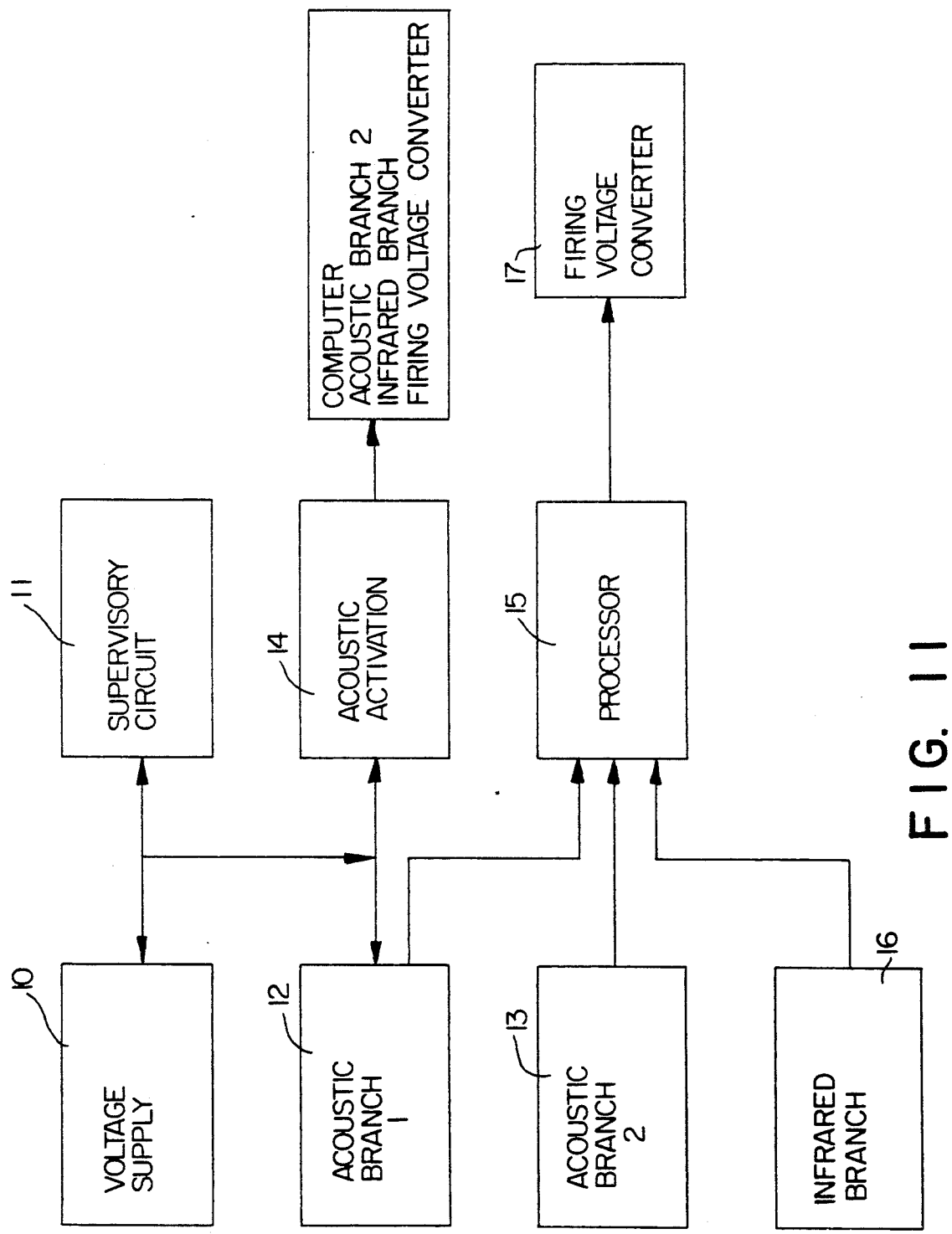
FIG. 11 shows a block circuit diagram of the main components of the inventive device.

FIG. 11 shows the components of the inventive device by means of a block diagram. A voltage source 10 regulated by a supervisory circuit 11 serves to supply the voltage to the device. The acoustic branch 12 is associated with the microphone M1 and is always in a switched-on condition. If long-lasting noise which is in a typical frequency range for vehicles is detected by the microphone M1, an acoustic activation stage 14 of a computer switches on a second acoustic branch 13, an infrared branch 16, and a firing voltage converter 17. The signals from the two acoustic branches 12 and 13 as well as from the infrared branch 16 are fed to a processor 15 which carries out a correlation analysis with the signal values. If the correlation function exceeds a defined threshold, the firing voltage converter 17 is enabled, i.e., the firing of the mine is "acoustically" released.

Figure 12:
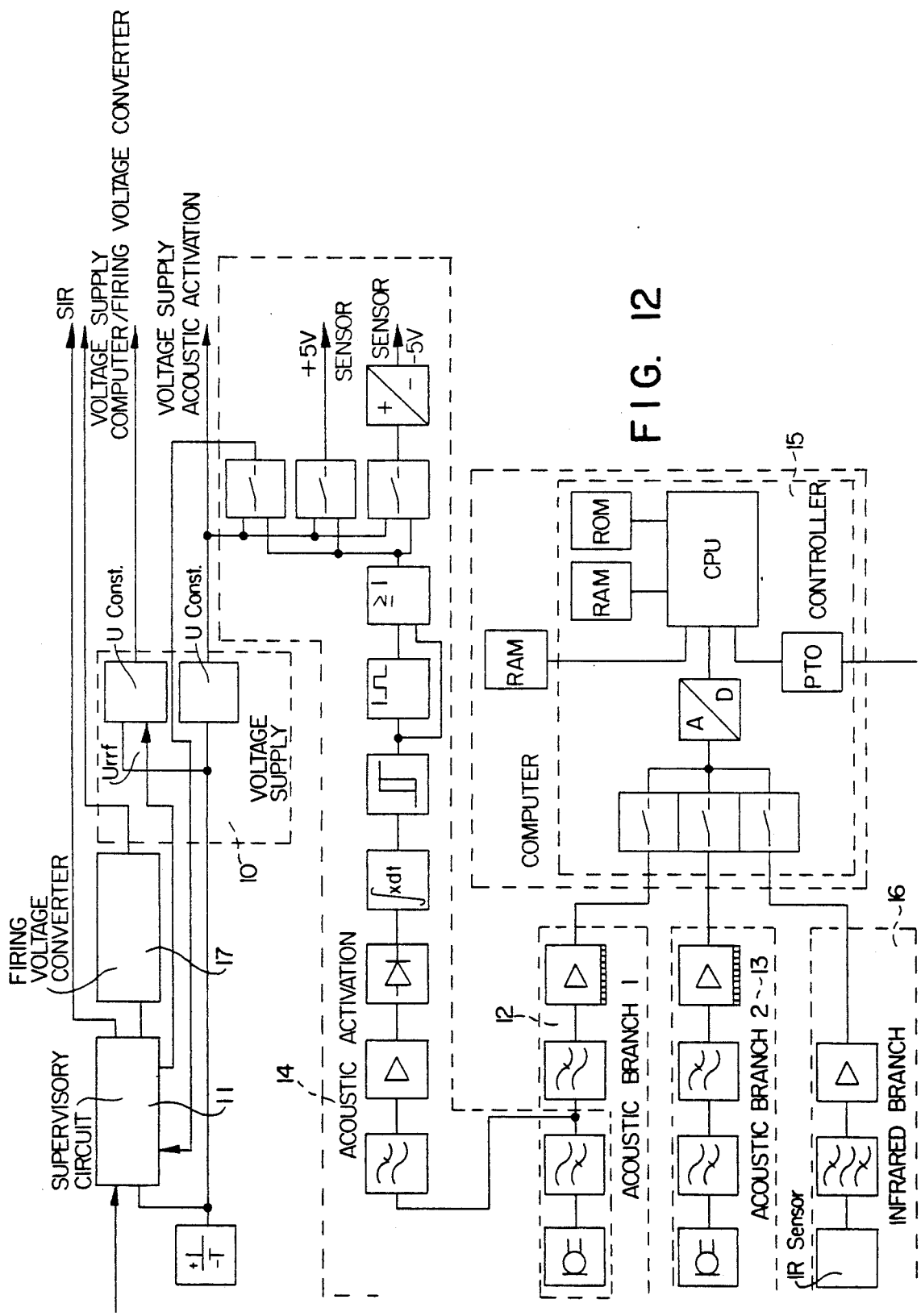
FIG. 12 shows a detailed block circuit diagram of the device.

FIG. 12 shows in detail the exact structure of the device. The first acoustic branch 123 has a microphone, a high-pass filter, a low-pass filter and a controlled amplifier. The second acoustic branch 13 is structured in the same manner. The infrared branch consists of an infrared sensor, a band-pass filter and an amplifier. The corresponding signals are fed through switches to the processor 15 which has an A/D converter, two RAM's, a ROM as well as a CPU.

Acoustic activation stage 14 comprises a low-pass filter, an amplifier, a rectifier, an integrator, a Schmitt-trigger, a monostable multi-vibrator, an OR-gate as well as corresponding switches and a U-invertor.

We claim:

1. A device for detecting objects in a target area and for firing a horizontal mine, said device being suitable for defense against tanks, comprising first and second microphones which detect noise including noise from a tank in said target area and which generate first and second acoustic signals in response thereto, an infrared sensor having a directional characteristic which is narrow with respect to said target area and which extends towards the center of said target area, said directional characteristic defining a target window within said target area, electronic evaluation means for calculating a correlation function of said first and second acoustic signals, for enabling a firing mechanism of said horizontal mine when a property derived from said correlation function exceeds a predetermined threshold, and for causing said horizontal mine to fire when said infrared sensor detects said object within said target area.

2. The device of claim 1 wherein said first and second microphones are directed towards said target area with their respective axes parallel to one another.

3. The device of claim 2 wherein said directional characteristic of said infrared sensor extends in parallel to the axes of said first and second microphone.

4. The device of claim 1 wherein only said first microphone and a portion of said electronic evaluation means are initially switched on in a first operational phase of said device, and wherein said electronic evaluation means further comprises means for switching on said second microphone and the remainder of said electronic evaluation means to initiate a second operational phase of said device when said first microphone detects a noise typical for a tank, and means for switching on said infrared sensor and for enabling said firing mechanism to initiate a third operational phase of said device when said property derived from said correlation function exceeds said predetermined threshold.

5. The device of claim 1 wherein said first and second microphones are located in a horizontal plane adjacent to said mine, and said infrared sensor is located between said first and second microphones.

6. The device of claim 1 wherein said first and second microphone are directional microphones having first and second acoustic directional characteristics defining an acoustic window within said target area, said target window being within said acoustic window.

7. The device of claim wherein said first and second microphones are separated by a distance of about 0.5 m.

* * * * *